US008170814B2

(12) United States Patent
Wang et al.

(10) Patent No.: US 8,170,814 B2
(45) Date of Patent: May 1, 2012

(54) SYSTEMS AND METHODS TO DETERMINE AN IMPEDANCE MISMATCH

(75) Inventors: Jin Wang, Union City, CA (US); Kapil Shrikhande, Berkeley, CA (US); Richard D. Hart, Concord, CA (US); Raghvendra Savoor, Walnut Creek, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1241 days.

(21) Appl. No.: 11/803,698

(22) Filed: May 15, 2007

(65) Prior Publication Data

US 2008/0288190 A1 Nov. 20, 2008

(51) Int. Cl.
*G01R 15/00* (2006.01)

(52) U.S. Cl. ............... 702/57; 702/58; 702/59; 702/65; 702/69; 702/90

(58) Field of Classification Search ............... 702/57–59
See application file for complete search history.

(56) References Cited

U.S. PATENT DOCUMENTS

| 5,920,846 | A * | 7/1999 | Storch et al. ................. 705/7 |
| 6,177,801 | B1 * | 1/2001 | Chong ......................... 324/520 |
| 7,054,433 | B1 * | 5/2006 | Garland et al. ............... 379/227 |
| 2001/0043568 | A1 * | 11/2001 | McHale et al. ............... 370/254 |
| 2002/0097732 | A1 * | 7/2002 | Worster et al. ................ 370/408 |
| 2002/0097792 | A1 | 7/2002 | Lanier et al. |
| 2004/0044489 | A1 * | 3/2004 | Jones et al. .................... 702/79 |
| 2005/0169315 | A1 * | 8/2005 | Jiang et al. .................... 370/493 |
| 2008/0267215 | A1 * | 10/2008 | Blackburn et al. ............ 370/468 |
| 2008/0288190 | A1 | 11/2008 | Wang et al. |
| 2009/0150925 | A1 * | 6/2009 | Henderson ...................... 725/34 |

OTHER PUBLICATIONS

"Full service VDSL—System architecture and customer premises equipment," Series H: Audiovisual and Multimedia Systems: Broadband and triple-play multimedia services—Broadband multimedia services over VDSL; ITU-T Recommendation H.610; Jul. 2003; International Telecommunication Union; Printed in Geneva, Switzerland; 128 pages.

* cited by examiner

*Primary Examiner* — Drew A Dunn
*Assistant Examiner* — Mischita Henson
(74) *Attorney, Agent, or Firm* — Toler Law Group, PC

(57) ABSTRACT

In a particular embodiment, a method is disclosed that includes receiving data related to a customer premise equipment (CPE) device and determining an impedance mismatch between a transmission line and the CPE device based on the received data. The method further includes initiating removal of a source of the impedance mismatch in response to determining the impedance mismatch.

21 Claims, 7 Drawing Sheets

SYSTEMS AND METHODS TO DETERMINE AN IMPEDANCE MISMATCH

FIELD OF THE DISCLOSURE

The present disclosure is generally related to systems and methods to determine an impedance mismatch.

BACKGROUND

In general, a perceived quality of a data communications service depends, in part, on the speed of the service. Such speed may be impacted by impedance mismatches between a transmission line and a customer premises equipment (CPE) device, such as a modem. For example, problems between a central office and a customer premises (i.e., outside plant problems) may reduce data communication speeds. Additionally, the speed of the data communications service may be impaired by elements within the customer premises, such as poor wiring, faulty equipment, etc. Hence, there is a need for a system and method to determine an impedance mismatch.

DETAILED DESCRIPTION OF THE DRAWINGS

In a particular illustrative embodiment, a method is disclosed that includes receiving data related to a customer premise equipment (CPE) device and determining an impedance mismatch between a transmission line and the CPE device based on the received data. The method further includes initiating removal of a source of the impedance mismatch in response to determining the impedance mismatch.

In another particular illustrative embodiment, a system includes processing logic and memory accessible to the processing logic. The memory includes instructions executable by the processing logic to perform a method of determining a source of an impedance mismatch. The method includes receiving active line data from a customer premise equipment (CPE) device, where the active line data includes noise detected at the CPE device when a digital subscriber line (DSL) is present on a transmission line. The method further includes determining a source of an impedance mismatch between the transmission line and the CPE device based on the active line data and initiating removal of the source of the impedance mismatch in response to determining the source.

In still another particular illustrative embodiment, a method is disclosed that includes collecting data from a customer premises equipment (CPE) device at a server. The data is related to transmission quality. The method further includes determining an impedance mismatch between a transmission line and the CPE device and determining the presence of a bridged tap based on the impedance mismatch.

In yet another particular illustrative embodiment, a method of determining an impedance mismatch in a communications loop is disclosed that includes applying an electrical excitation to a downstream (or upstream) communication channel of a communications loop. The method further includes evaluating a spread of energy into an upstream (or downstream) communications channel and detecting an impedance mismatch based on the spread of energy.

Figure 1:
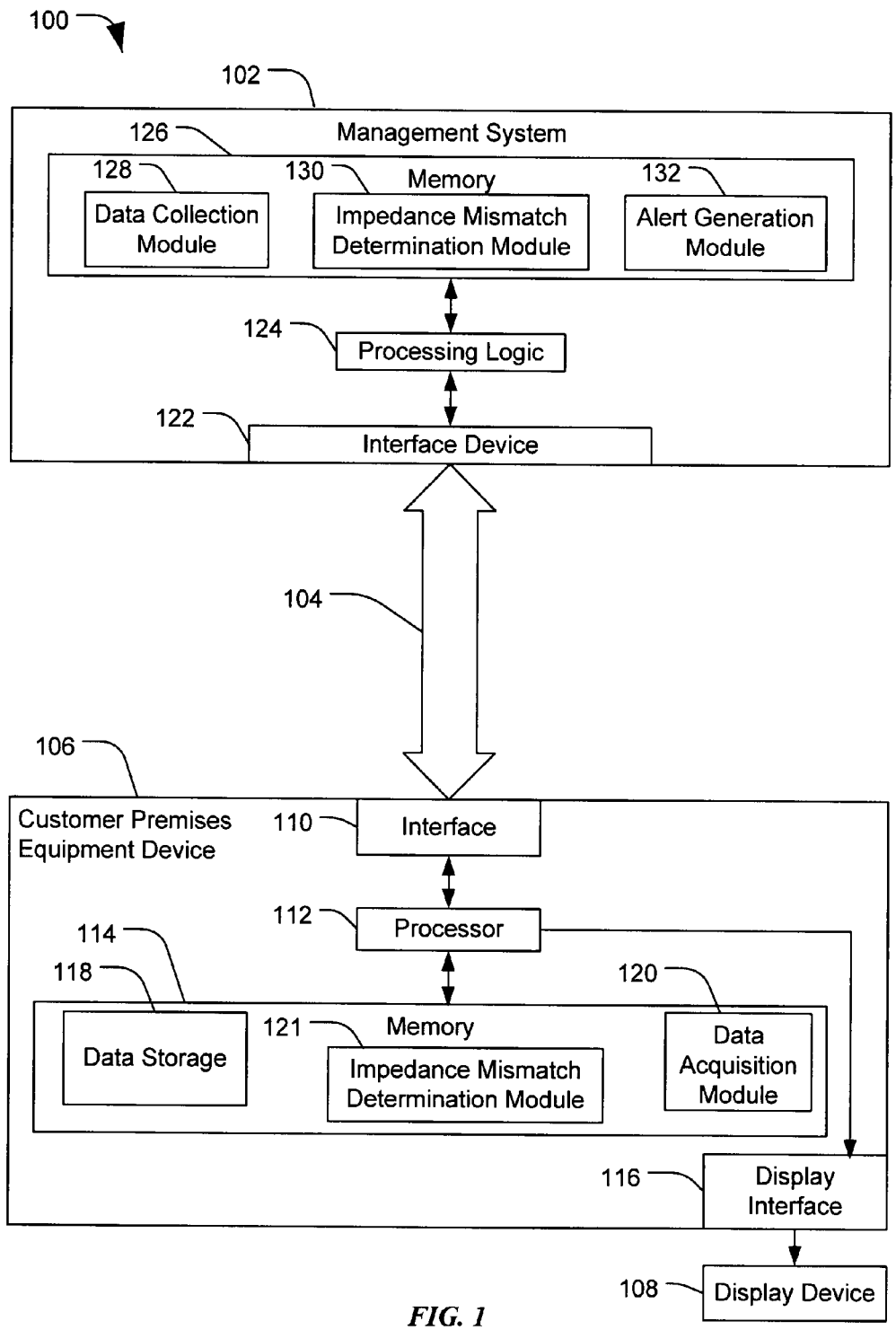
FIG. 1 is a block diagram of a particular illustrative embodiment of a system to determine an impedance mismatch.

FIG. 1 is a block diagram of a particular illustrative embodiment of a system 100 to determine an impedance mismatch. The system 100 includes a management system 102 that communicates with one or more customer premises equipment (CPE) devices, such as the CPE device 106, via a communications loop 104, which may be a communications link to a central office, to an edge of a wide area network (such as the Internet), or any combination thereof. In an illustrative embodiment, the communications loop 104 provides a broadband communications path, including upstream and downstream communication channels, between the management system 102 and the CPE device 106. In an illustrative embodiment, the CPE device 106 is a digital subscriber line (DSL) modem device. In another illustrative embodiment, the broadband communications path carries video and audio data, and the CPE device 106 can be a set-top box device that provides a broadband connection and that communicates such video and audio data to a display device 108, such as a television.

The CPE device 106 includes an interface 110 that facilitates communications between the CPE device 106 and the communications loop 104. The CPE device 106 also includes a processor 112 that is coupled to the interface 110. The CPE device 106 also includes a memory 114 that is accessible to the processor 112. The memory 114 includes a data acquisition module 120 that is executable by the processor 112 to obtain data related to the communications loop. In a particular illustrative embodiment, the data acquisition module 120 can be executable by the processor 112 to measure various parameters related to the communications loop and to store the parameters in a data storage area 118. Additionally, the CPE device 106 can include an impedance mismatch determination module 121, which is executable by the processor 112 to determine an impedance mismatch between the transmission line and the CPE device 106 based on the measured parameters. The parameters can include a signal-to-noise ratio, active line noise, other parameters, or any combination thereof. In general, the data storage area 118 may store communications loop diagnostic data (parameters) related to the communications loop 104. In a particular illustrative embodiment, the CPE device 106 may communicate data related to the determination of the impedance mismatch to the management system 102.

The management system 102 includes an interface device 122 that facilitates communications between the management system 102 and the CPE device 106 via the communications loop 104. The management system 102 also includes processing logic 124 that is coupled to the interface 122. The management system 102 also includes a memory 126 that is accessible to the processing logic 124. In an illustrative embodiment, the management system 102 can include multiple servers and the processing logic 124 may be distributed among the multiple servers, either independently to process data or redundantly to provide processing services if a particular processor experiences a fault. In another particular embodiment, the management system 102 can be a single server and the processing logic 124 can include a single processor. The memory 126 includes a data collection module 128 that is executable by the processing logic 124 to obtain communications loop diagnostic data related to the CPE device 106. In general, the communications loop diagnostic data may be collected from the CPE device 106 or from a database (not shown) that stores diagnostic data received from the CPE device 106.

In an illustrative embodiment, the processing logic 124 can execute the data collection module 128 to generate a request for communications loop data, which can be sent to the CPE device 106 via the communications loop 104. The data collection module 128 may also receive communications loop data from the CPE device 106 in response to the request. In another illustrative embodiment, the processing logic 124 can execute the data collection module 128 to generate a query to a database that stores communications loop diagnostic data related to the CPE device 106, and the data collection module 128 may be utilized to receive the data from the database in response to the request.

After the communications loop data is received, the processing logic 124 can execute an impedance mismatch determination module 130 to determine an impedance mismatch between the communications loop and the CPE device 106 based on the communications loop data. The processing logic 124 can also execute the alert generation module 132 to initiate a work order to repair a source of the impedance mismatch based on the determination of the impedance mismatch.

In a particular illustrative embodiment, an impedance mismatch in the communications loop 104 may be caused by a bridged tap, a cable fault, an untwisted segment within a twisted pair, another impedance source, or any combination thereof. In a particular illustrative, non-limiting embodiment, an impedance mismatch may be detected when an actual impedance of the communications loop deviates from an expected impedance due to disturbances caused by a bridged tap, a cable fault (open circuit, short circuit, grounding problem, an untwisted wire (such as an untwisted wire at a crossbox, at a splicing point, at a serving terminal, at another device of the communications loop, or any combination thereof), a flat drop, or a flat inside wire. In a particular illustrative embodiment, the impedance mismatch may be more pronounced when the source of the disturbance is close to either end of the communications loop (e.g., close to the central office or close to the customer premises).

In an illustrative embodiment, an impedance mismatch between a central office and the communications loop or between the CPE device 106 and the communications loop may have a negligible impact on insertion loss or quiet line noise; however, the impedance mismatch enhances noise when a digital subscriber line (DSL) signal is present and may negatively impact a DSL rate. In a particular embodiment, data representing the active line noise associated with the communications loop may increase rapidly as the frequency approaches an upstream frequency boundary or a downstream frequency boundary for the DSL service. The increase in noise may adversely impact the DSL data rate. For example, in a particular illustrative embodiment, a Very high bit-rate Digital Subscriber Line (VDSL) modem may experience a data rate performance decrease of as much as 15 percent to 60 percent due to an impedance mismatch. For example, a three-foot flat pair (untwisted wire pair) segment of a twisted pair wire at the end of a 3,000 foot VDSL loop (at the customer side) may cause a VDSL downstream data rate to decrease from 37 Megabits per second (Mb/s) to 31 Mb/s. If the flat pair is located near the beginning of a 3,000 fit VDSL loop (at a Digital Subscriber Line Access Multiplexer (DSLAM) side), a VDSL upstream data rate may decrease from 5 Mb/s to as low as 2 Mb/s.

In a particular embodiment, the processing logic 124 and the memory 126 may be hosted at a central office of a telecommunications network. The memory 126 may include instructions executable by the processing logic 124 to perform a method of determining a source of an impedance mismatch within the communications loop 104. The method executable by the processing logic 124 can include sending data to the CPE device 106 to request active line data associated with a transmission line of the communications loop that is coupled to the CPE device 106. The method also includes receiving active line data from the CPE device 106, where the active line data includes data related to noise detected at the CPE device when a digital subscriber line (DSL) is present on a transmission line. The method also includes determining a source of an impedance mismatch between the communications loop 104 and the CPE device 106 based on the active line data and initiating removal of the source of the impedance mismatch in response to determining the source. In a particular illustrative embodiment, the removal may be initiated by generating an alert to a user at a central office, to a work order system, to another system, or any combination thereof, using the alert generation module 132.

In a particular illustrative embodiment, the management system 102 uses the impedance mismatch determination module 130 to determine the presence of the impedance mismatch by comparing a shape of a noise spectrum derived from the active line data to a threshold shape. In another particular illustrative embodiment, the management system 102 uses the impedance mismatch determination module 130 to determine the presence of the impedance mismatch by comparing a noise level derived from the active line data to a threshold noise level. In still another particular illustrative embodiment, the management system 102 may execute the mismatch determination module 130 to determine a proximity of the impedance mismatch to the CPE device based on a peak value of the active line noise at a frequency boundary, such as an upstream data frequency boundary or a downstream data frequency boundary.

In a particular illustrative embodiment, the management system 102 collects data from a device at a central office (such as the interface device 122, a digital subscriber line access multiplexer, another interface device, or any combination thereof) and collects data from the CPE device 106. The impedance mismatch determination module 130 can be utilized by the management system 102 to determine a first curve shape based on the data collected from the central office device and a second curve shape based on the data collected from the CPE device 106. The impedance mismatch determination module 130 can be utilized to compare a first slope of a first curve shape at a channel frequency boundary from the central office device to a second slope of a second curve shape at a channel frequency boundary from the CPE device 106. The impedance mismatch determination module 130 can determine a relative location of the impedance mismatch based on the comparison. For example, the impedance mismatch determination module 130 can determine that the source of the impedance mismatch is located closer to the CPE device 106 than to the central office device when the second slope is greater than the first slope. In a particular embodiment, the collected data from the CPE device 106 and from the central office device includes active line noise data, and the proximity of the impedance mismatch to the end of the communications loop is reflected by the slope of the curve shape, such that the closer the impedance mismatch is to the end device (i.e., the end of the communications loop), the greater the relative slope of the curve (i.e., the active line noise increases).

In a particular illustrative embodiment, the management system 102 uses loop diagnostic information to detect impedance mismatches. The loop diagnostic information may be reported from the CPE device 106 via the communications loop 104. In a particular illustrative embodiment, the loop diagnostic information may be provided to a database at a central office or to the management system 102.

Figure 2:
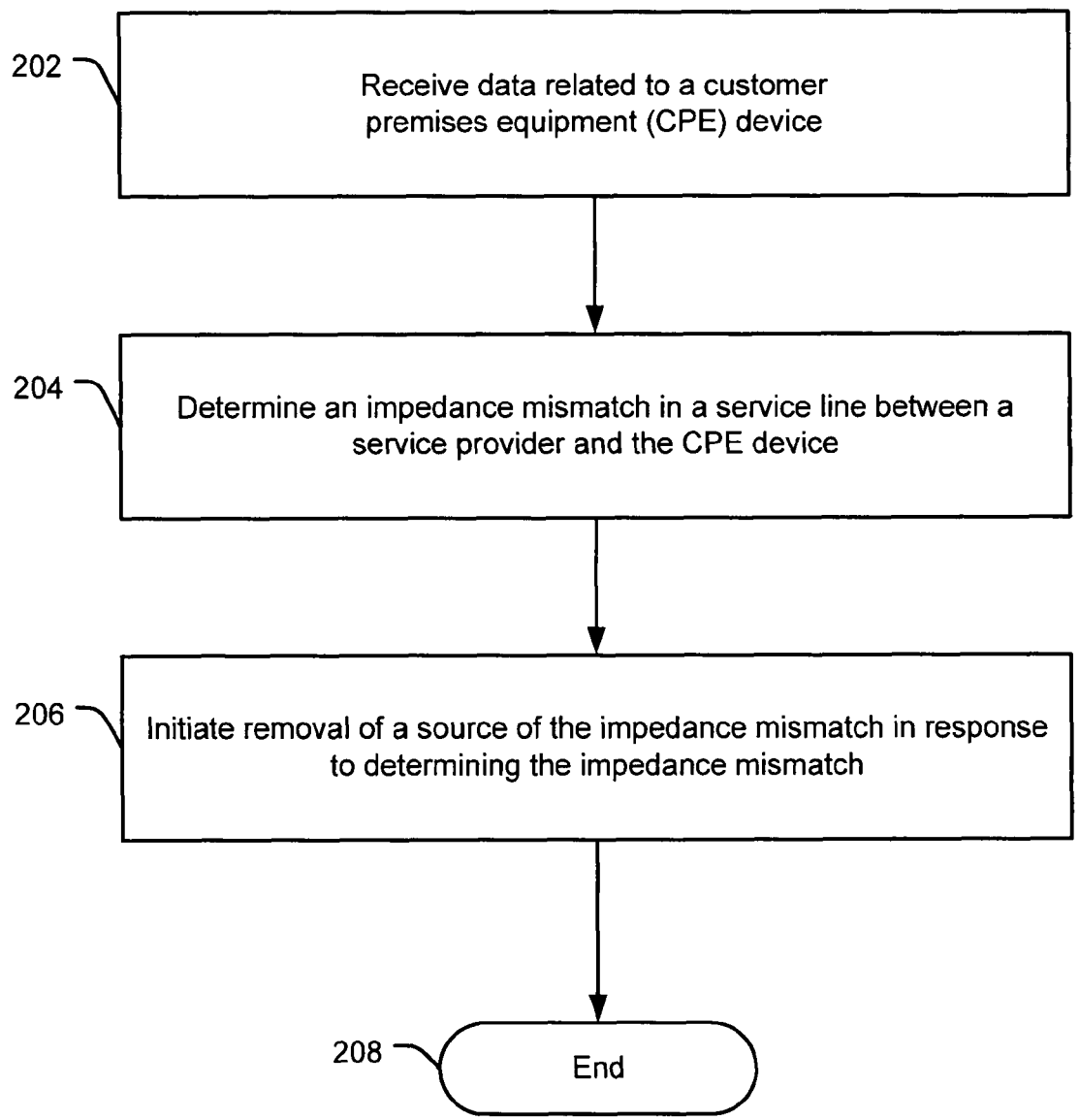
FIG. 2 is a flow chart of a particular illustrative embodiment of a method of determining an impedance mismatch.

FIG. 2 is a flow chart of a particular illustrative embodiment of a method of determining an impedance mismatch. At 202, the method includes receiving data that is related to a customer premises equipment (CPE) device. The received data can include loop loss data, active line noise data, signal-to-noise ration (SNR) data, other data, or any combination thereof. In a particular illustrative embodiment, the data may be collected from the CPE device by sending a request to the CPE device for the data and by receiving the data from the CPE device in response to the request. In another particular embodiment, the data may be received by retrieving the data from a server adapted to collect the data from the CPE device.

Advancing to 204, the method further includes determining an impedance mismatch in a service line (such as a transmission line, a communications loop, a twisted pair wire, or any combination thereof) between a service provider and the CPE device. In an illustrative embodiment, the source of the impedance mismatch can be a bridged tap, an untwisted segment of twisted pair wiring, another source of the impedance mismatch, or any combination thereof. Determining the impedance mismatch can include estimating a noise level associated with the CPE device based on the received data and determining the presence of a source of an impedance mismatch, such as the bridged tap, when the noise level exceeds a threshold noise level. In another particular illustrative embodiment, determining the impedance mismatch can include estimating a noise spectrum associated with the CPE device based on the received data and determining the presence when a specific portion of the noise spectrum exceeds a threshold spectrum.

Proceeding to 206, the method further includes initiating removal of a source of the impedance mismatch in response to determining the impedance mismatch. In a particular illustrative embodiment, a work order may be created to remove the source of the impedance mismatch. In a particular illustrative embodiment, the work order may be provided to a maintenance scheduling system. In another particular illustrative embodiment, the removal may be initiated by scheduling a maintenance worker to remove the source of the impedance mismatch based on the work order. In another particular illustrative embodiment, a user may be notified via an email, a text message, another alert, or any combination thereof, that an impedance mismatch requires service. The method terminates at 208.

In a particular illustrative embodiment, determining the impedance mismatch includes determining a curve shape of a graph of active line noise data at an upstream frequency boundary, at downstream frequency boundary, or at any combination thereof.

In general, it should be understood that determining the impedance mismatch described with respect to 204 above may include curve fitting, estimating noise or noise spectra, other data analysis techniques, or any combination thereof. Further, one or more different techniques may be used together to determine an impedance mismatch. Further, in a particular illustrative embodiment, determining the impedance mismatch can include identifying a source of an impedance mismatch, identifying a relative proximity of the source of an impedance mismatch to an end of the communications link, or any combination thereof.

Figure 3:
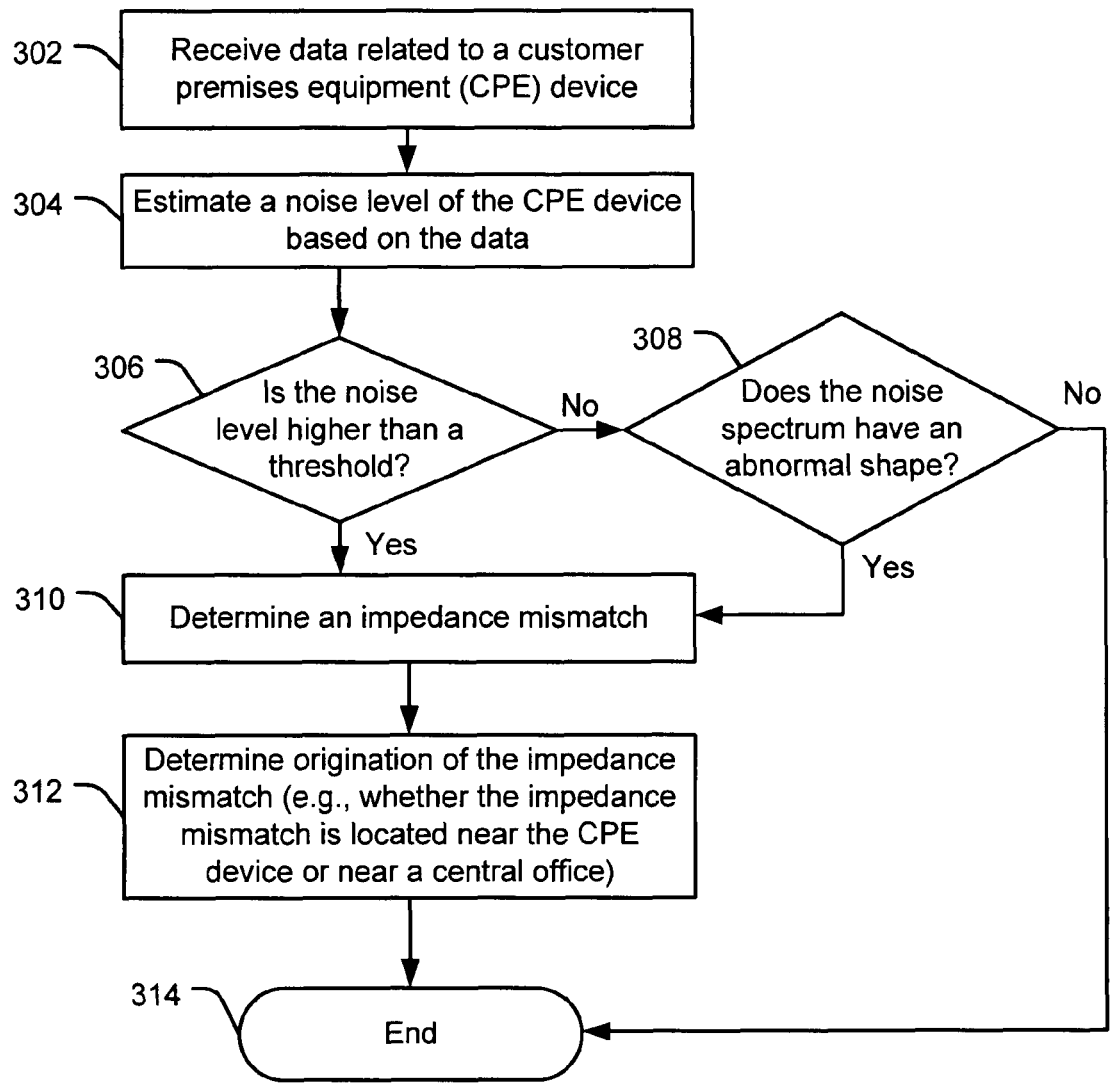
FIG. 3 is a flow chart of a second particular illustrative embodiment of a method of determining an impedance mismatch.

FIG. 3 is a flow chart of a second particular illustrative embodiment of a method of determining an impedance mismatch. At 302, data is received that is related to a customer premises equipment (CPE) device. The data may be received from the CPE device, from a database at a central office, from a server, or from any combination thereof. For example, in a particular illustrative embodiment, the data may include stored data related to a threshold for the particular CPE device and may also include data retrieved from the CPE device indicating transmission line performance parameters.

Continuing to 304, a noise level of the CPE device is estimated based on the data. Proceeding to 306, the system determines whether the noise level is higher than a threshold noise level, and if it is not, the method advances to 308 and determines whether the noise spectrum has an abnormal shape. If not, the method terminates at 314.

Returning to 306, if the noise level is higher than a threshold, the method advances to 310 and an impedance mismatch is determined. Returning to 308, if the noise spectrum has an abnormal shape, the method advances to 310 and an impedance mismatch is determined. Advancing to 312, the origination or source of the impedance mismatch is determined. In a particular illustrative embodiment, the determination of the origination or source of the impedance mismatch includes determining a relative location of the impedance mismatch, such as proximate to the CPE device or proximate to the service provider or central office. In a particular illustrative embodiment, active line noise data from the CPE device and active line noise data collected by a digital subscriber line access multiplexer (DSLAM) may be compared to determine the relative location of the source of the impedance mismatch. The method terminates at 314.

In a particular illustrative embodiment, active line noise for a communications link between the CPE device and a central office may be calculated using a transmission power value ($P_{TX}$), logarithmic representation values for the loop insertion loss (HLOG), and a signal-to-noise ratio (SNR) value. For example, active line noise (ALN) at an xDSL modem may be estimated as follows:

$$ALN = SNR - (P_{TX} + HLOG) \qquad \text{(Equation 1)}$$

In a particular illustrative embodiment, the TX Power is specified in a VDSL Standard, such as ITU-T Rec. H.610 (July, 2003) Full Service VDSL—System Architecture and Customer Premises Equipment Standard, the VDLS-2 Standard, or any combination thereof. In a particular illustrative embodiment, a severe impedance mismatch may indicate a splice, a bridged tap, poor wiring, or other sources of impedance mismatch in close proximity to either end of a communications loop. Such a severe impedance mismatch may be indicated by a relatively steep roll off at upstream and/or downstream frequency boundaries. Further, such a severe impedance mismatch may be indicated by a relatively steep upward slope or tail determined from active line noise data at such a frequency boundary. In general, the estimated ALN is different from a quiet line noise (QLN) because the ALN represents noise within or at the xDSL modem when a DSL signal is present on the transmission line (i.e., when the xDSL modem is active). In contrast, QLN represents noise within or at the xDSL modem when the DSL signal is absent.

Figure 4:
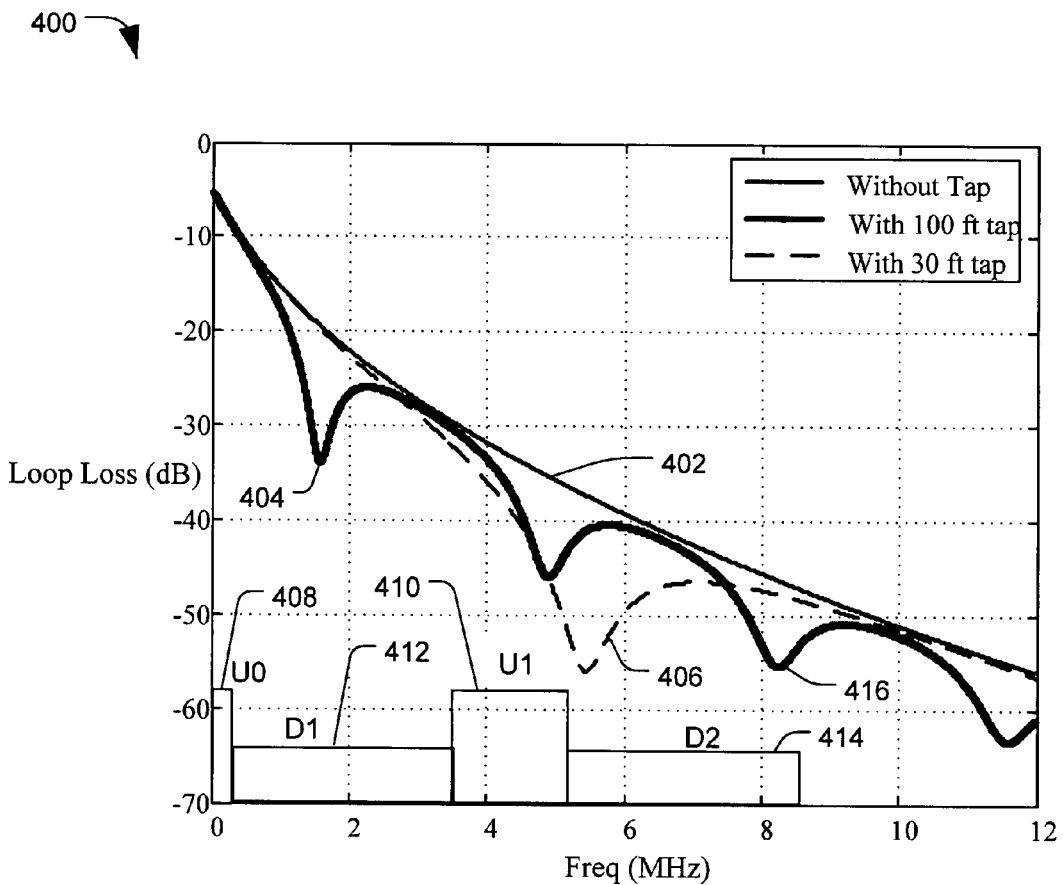
FIG. 4 is a particular illustrative graph of loop loss versus frequency for a communications loop with and without a bridged tap.

FIG. 4 is a particular illustrative graph 400 of loop (signal) loss versus frequency for a 2000 foot communications loop including 26 gauge cable with and without a bridged tap. The graph 400 includes an exponential line 402 indicating a communications loop without a bridged tap. The graph 400 also includes a line 404 indicating a communications loop with a 100 foot bridged tap. The graph 400 further includes a line 406 indicating a communications loop with a 30 foot bridged tap. In this particular illustrative embodiment, data may be transmitted (upstream) from the CPE device at frequency bands $U_0$ and $U_1$, indicated at 408 and 410, respectively. Data may be received (downstream) at the CPE device at frequency bands $D_1$ and $D_2$, indicated at 412 and 414, respectively. The upstream frequency bands ($U_0$ and $U_1$) 408 and 410 and the downstream frequency bands ($D_1$ and $D_2$) 412 and 414 represent frequency bands or channels of a VDSL frequency band plan North America 998.

In the particular example illustrated in FIG. 4, the loop loss for the communications loop falls from approximately minus five (−5) decibels at zero (0) megahertz (MHz) to approximately minus fifty five (55) decibels at 12 MHz. In contrast, the loop loss data 404 begins to fall steeply at approximately a boundary of the downstream data frequency band (D1) 412. Similarly, the loop loss data 404 falls off at a boundary of the upstream data frequency band (U1) 410 and again at a boundary of the downstream data frequency band (D2) 414. The loop loss data 406 begins to fall off at a boundary of the downstream data frequency band (D1) 412 and rolls off at an increasing slope until the boundaries of the upstream data frequency band (U1) 410 and the downstream data frequency band (D2) 414. The loop data loss 406 reaches a local minimum at approximately the boundary between the upstream and downstream data frequency bands (U1) 410 and (D2) 414, respectively. In a particular illustrative embodiment, the steep roll off may be detected by monitoring signal-to-noise ratio, the active line noise, other parameters, or any combination thereof. Further, the location of the local minima may be utilized to determine an approximate location of the source of the impedance mismatch within the communications loop.

In general, if the tap length and wire gauge are known, the locations and depth of the notches, such as the notch 416, can be predicted and the impact of the bridged tap on the VDSL rate can also be predicted. The VDSL downstream data rate can be adversely impacted by the location of a bridged tap. For example, the dependence of the VDSL downstream rate on the location of the bridged tap is illustrated in TABLE 1.

TABLE 1

| | Bridged Tap Length: 0 Ft (i.e. No bridged Tap) | Bridged Tap: 10 feet | Bridged Tap: 20 feet | Bridged Tap: 30 feet |
|---|---|---|---|---|
| Bridged Tap at 500 feet from VDSL modem | 33.5 Mb/s | 32.6 Mb/s | 32.4 Mb/s | 32.1 Mb/s |
| Bridged Tap at 0 feet from VDSL modem | 33.5 Mb/s | 30.3 Mb/s | 25.1 Mb/s | 21.3 Mb/s |

TABLE 1 illustrates that the proximity of the bridged tap to a VDSL modem impacts the VDSL rate, because the bridged tap changes the impedance of the transmission line, resulting in an impedance mismatch between the modem and cable and resulting in noise enhancement. The impedance may be impacted by the presence of a bridged tap, a cable fault, a bad splice, a flat wire segment, other impairments, or any combination thereof. The location of the impedance mismatch relative to the VDSL modem (relative to either end of the communications loop) determines the severity of the impact of such impedance mismatch.

In general, by separating the upstream and downstream data into different frequency channels, interference between the upstream and downstream signal is reduced. However, the presence of a bridged tap near an end of the communications loop (i.e., near the CPE device or near the central office) may cause an increase in interference resulting in increased noise. In a particular illustrative embodiment, a noise level within an xDSL modem may be evaluated when an xDSL signal is present on the line. If noise is high due to crosstalk between the upstream and the downstream xDSL signal, the impedance mismatch is severe. If the cable does not have a bridged tap or a cable fault, then it is possible that a flat pair segment of twisted pair wiring may exist at the customer premises or within the communications loop.

In a particular illustrative embodiment, an impedance mismatch between a communications loop and a CPE device may be determined from loop diagnostic data, such as loop loss and signal-to-noise (SNR) data from the CPE device or from a central office device, such as a digital subscriber line access multiplexer (DSLAM). In an illustrative embodiment, the diagnostic data may be collected by and retrieved from a database that includes such information. The loop noise level inside the xDSL modem is estimated based on the loop diagnostic data. If the noise level is higher than a predetermined threshold or a noise spectrum has an abnormal spectrum shape (such as an upward tail at or near one or more channel frequency boundaries) due to enhanced downstream-upstream cross-talk, an impedance mismatch can be identified.

In a particular illustrative embodiment, the impedance mismatch is determined based on an estimation of active line noise (ALN) at the modem when the modem is active. The estimated ALN is different from a quiet line noise (QLN) value because the ALN value represents noise within or at the xDSL modem when a DSL signal is present on the transmission line (i.e., when the xDSL modem is active). In contrast, QLN represents noise within or at the xDSL modem when the DSL signal is absent. To determine crosstalk between the upstream and downstream frequency bands (channels), the ALN is obtained. The ALN increases significantly as the bridged tap approaches the CPE device (such as a VDSL modem, an xDSL modem, a residential gateway, another broadband communication device, or any combination thereof).

Figure 5:
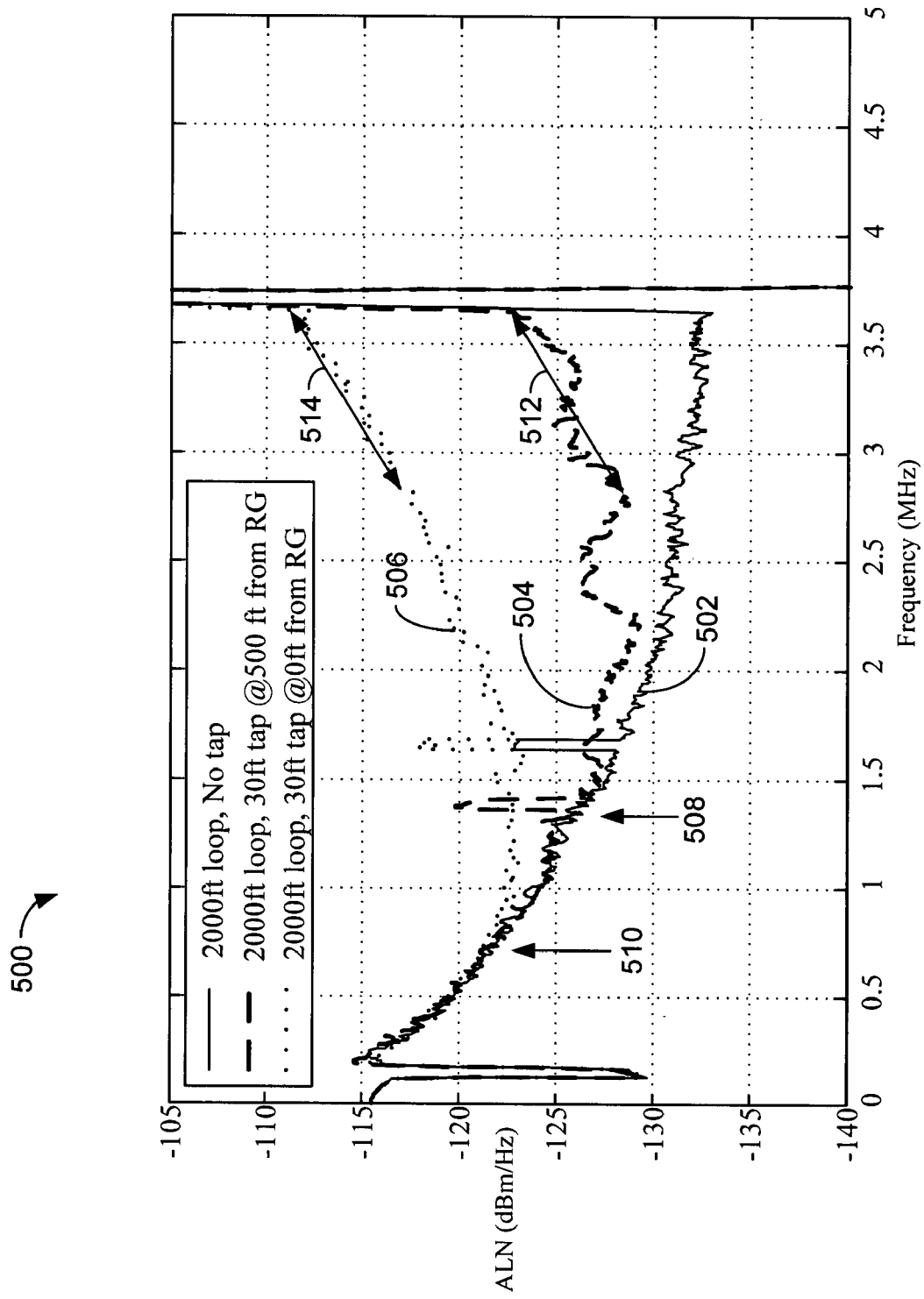
FIG. 5 is a particular illustrative graph of Active Line Noise (ALN) versus frequency for a communications loop with and without a bridged tap.

FIG. 5 is a particular illustrative graph 500 of Active Line Noise (ALN) versus frequency for a 2000 foot communications loop with and without a bridged tap. The graph 500 includes communications loop data 502 indicating no bridged tap, includes communications loop data 504 indicating a 30 foot bridged tap approximately 500 feet from a customer premises equipment (CPE) device, such as a residential gateway (RG), and includes communications loop data 506 indicating a 30 foot bridged tap located approximately zero (0) feet from the CPE device. As indicated at 508, the communications loop data 504 begins to deviate from the communications loop data 502 at approximately 1.375 MHz. The communications loop data 504 gradually increases to approximately −123 dBm/Hz at 3.6 MHz, at an approximate downstream data frequency boundary (such as downstream data frequency boundary (D1) 412 in FIG. 4). At 510, the communication loop data 506 deviates from the communication loop data 502 at approximately 0.75 MHz and gradually increases to approximately −112 dBm/Hz at 3.6 MHz. In a particular illustrative embodiment, a slope of a representative line indicated at 512 that can be derived from a fit to the communications loop data 504 indicates a bridged tap at an end of the communications loop. In another particular illustrative embodiment, a slope of a representative line indicated at 514 that can be derived from a fit to the communications loop data 506 indicates a bridged tap at an end of the communications loop. In a particular illustrative embodiment, the slopes of the representative lines 512 and 514 may be approximately equal. The slope of the active line noise proximate to the frequency boundary provides an indication of the presence of a bridged tap. If the slope of the representative lines 512 or 514 exceeds a slope threshold, the communications loop may include a bridged tap. Further, the value of the active line noise at the boundary provides an indication of the proximity of the bridged tap to the CPE device. The closer the bridged tap is to the CPE device, the more severe the active line noise becomes at the frequency boundaries.

Figure 6:
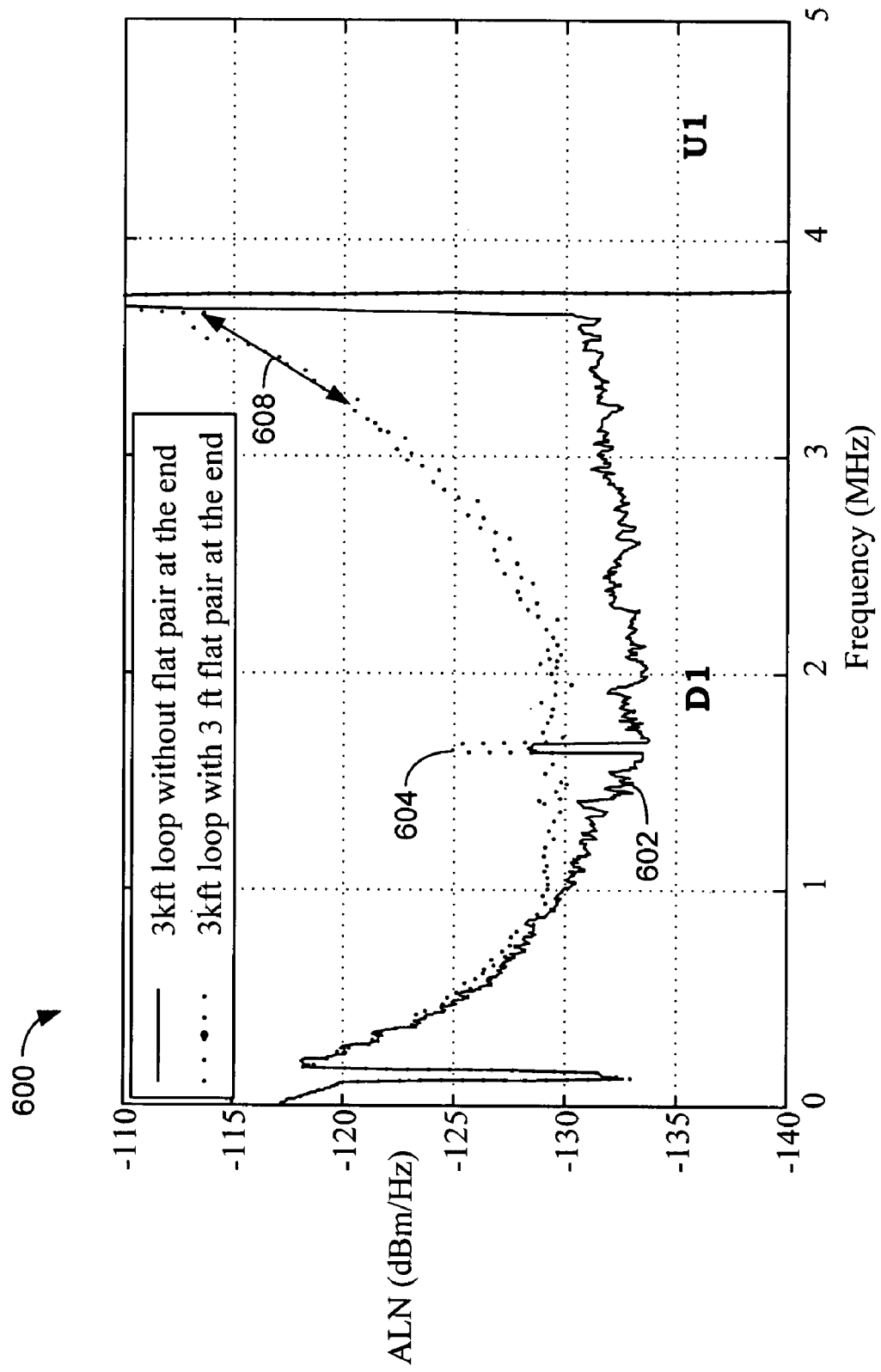
FIG. 6 is a second particular illustrative graph of ALN versus frequency for a communications loop with an untwisted wire (flat pair)

FIG. 6 is a second particular illustrative graph 600 of active line noise (ALN) versus frequency for a communications loop with an untwisted wire (flat pair). The graph 600 includes communications loop data 602 indicating a 3,000 foot loop without a flat pair segment of twisted pair wiring at the end of the loop and includes communications loop data 604 indicating a 3,000 foot loop with a 3 foot flat pair segment of twisted pair wiring at the end of the loop. Within the downstream data frequency band (D1) (such as the downstream data frequency band (D1) 412 in FIG. 4), the communications loop data 604 deviates from the communications loop data 606 at approximately 0.5 MHz and increases exponentially to approximately −113 dBm/Hz at approximately 3.6 MHz (i.e., at the boundary of the downstream data frequency band). The slope of a representative line indicated at 606 that can be derived from a fit to the communications loop data 604 indicates a flat pair at an end of the communications loop.

In still another particular illustrative embodiment, an impedance mismatch may be determined by observing a curve shape of the ALN data at a boundary of the upstream frequency band, of the downstream frequency band, or any combination thereof. If the ALN data indicates an upward tail at the end of the downstream frequency band, then crosstalk is pronounced and therefore the communications loop includes a severe impedance mismatch.

In general, while the preceding discussion has largely addressed VDSL modems, the methods and structures disclosed above may be utilized with any number of CPE devices. In a particular illustrative embodiment, the CPE device is an xDSL modem. In another particular illustrative embodiment, the CPE device is a VDSL modem that uses a VDSL transmission that includes a digital multi-tone (DMT) signaling format.

In conjunction with the configuration of structure described herein, the system and method disclosed include a server system, which may be located at a central office or at a service provider for broadband service, to receive communications loop data from a customer premises equipment (CPE) device, which can be located at a customer premises remote from the server system, or from a central office device (such as a DSLAM). The communications loop data can be signal-to-noise ratio (SNR) data, active line noise data, quiet line noise data, loop loss data, other data, or any combination thereof. The server system is adapted to determine an impedance mismatch based on the communications loop data and to initiate a repair of the communications loop based on the determination. In a particular illustrative embodiment, the server system can compare a slope of active line noise data associated with the CPE device to determine the presence of a bridged tap when the line noise data exceeds a first threshold and to determine the presence of an untwisted wire segment when the line noise data exceeds a second threshold. In a particular illustrative embodiment, the system may determine a relative location of the source of the impedance mismatch based on a line noise level. For example, a higher line noise level may indicate a closer proximity of the impedance source to the particular end of the communications loop than a lower line noise level.

Figure 7:
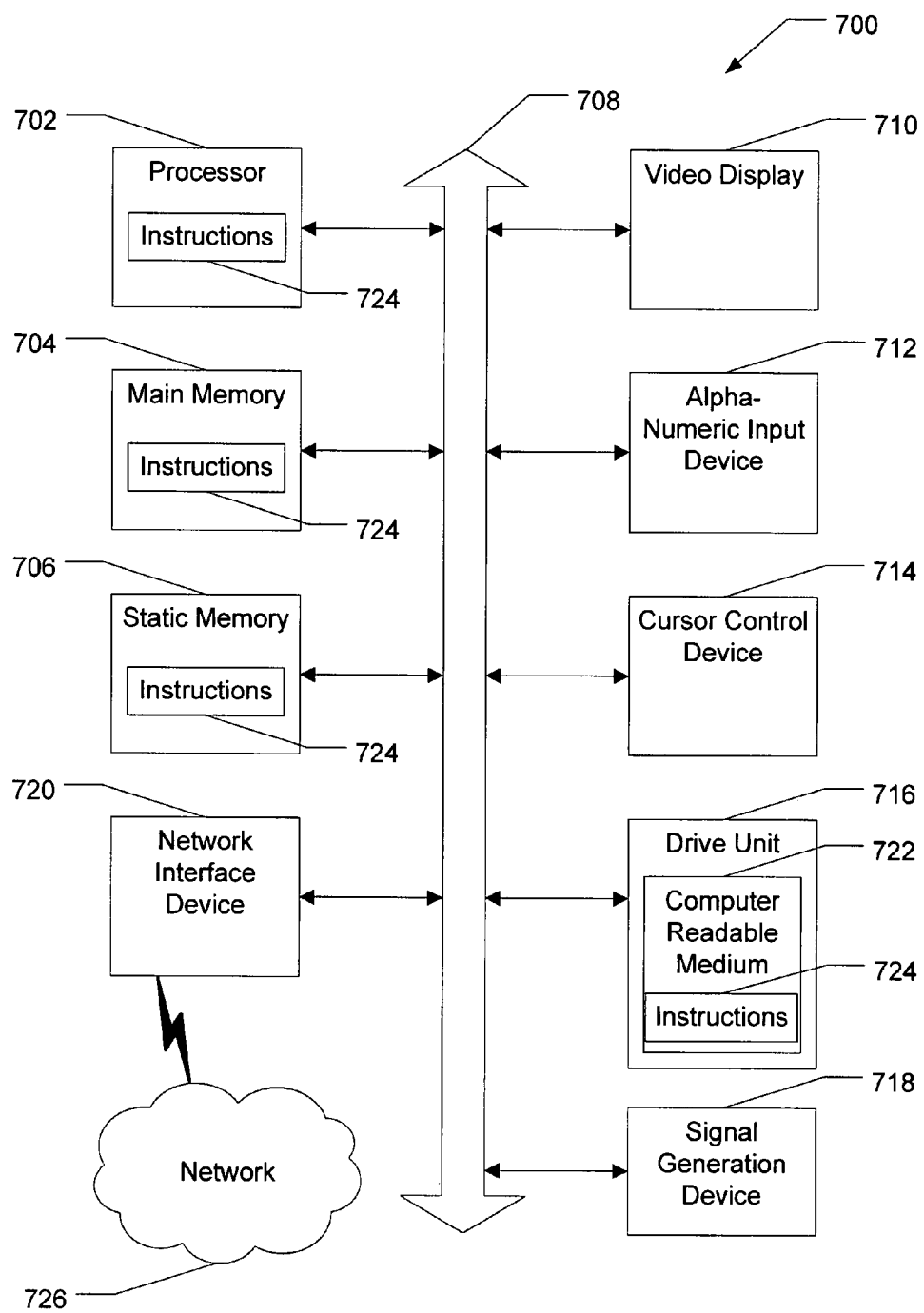
FIG. 7 is a block diagram of an illustrative embodiment of a general computer system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. The computer system 700 may operate as a standalone device or may be connected, e.g., using a network, to other computer systems or peripheral devices, such as the management system 102 and the CPE device 106, as illustrated in FIG. 1.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. Moreover, the computer system 700 can include a main memory 704 and a static memory 706, that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system to determine an impedance mismatch, the system comprising:
processing logic and a memory accessible to the processing logic, the memory including instructions executable by the processing logic to:
measure, at a customer premise equipment device, transmission quality data related to a communications loop between the customer premise equipment device and a server;

determine an impedance mismatch between a transmission line and the customer premise equipment device based on the measured transmission quality data, wherein determining the impedance mismatch comprises:
  determining curve shapes of active line noise at an upstream channel frequency boundary from a central office and at a downstream channel frequency boundary from the customer premise equipment device;
  determining a presence of the impedance mismatch when a first curve shape of active line noise at the upstream channel frequency boundary has a first slope that is greater than a first slope threshold or when a second curve shape of active line noise at the downstream channel frequency boundary has a second slope that is greater than a second slope threshold;
  performing a comparison of the first slope of the first curve shape at the upstream channel frequency boundary to the second slope of the second curve shape at the downstream channel frequency boundary; and
  determining a relative location of the impedance mismatch based on the comparison of the first slope to the second slope; and
  transmit a source and the relative location of the impedance mismatch to the server.

2. The system of claim 1, wherein the memory further includes instructions executable by the processing logic to compare a shape of a noise spectrum derived from the active line noise to a threshold shape.

3. The system of claim 1, wherein the memory further includes instructions executable by the processing logic to compare a noise level derived from the active line noise to a threshold noise level.

4. The system of claim 1, wherein the memory further includes instructions executable by the processing logic to determine a proximity of the impedance mismatch to the customer premise equipment device based on a peak value of the active line noise at the upstream channel frequency boundary.

5. A method, comprising:
  measuring, at a customer premise equipment device, transmission quality data related to a communications loop between the customer premise equipment device and a server;
  determining an impedance mismatch between a transmission line and the customer premise equipment device based on the measured transmission quality data, wherein determining the impedance mismatch comprises:
    determining curve shapes of active line noise at an upstream channel frequency boundary from a central office and at a downstream channel frequency boundary from the customer premise equipment device;
    determining a presence of the impedance mismatch when a first curve shape of active line noise at the upstream channel frequency boundary has a first slope that is greater than a first slope threshold or when a second curve shape of active line noise at the downstream channel frequency boundary has a second slope that is greater than a second slope threshold;
    performing a comparison of the first slope of the first curve shape at the upstream channel frequency boundary to the second slope of the second curve shape at the downstream channel frequency boundary; and
    determining a relative location of the impedance mismatch based on the comparison of the first slope to the second slope; and
  transmitting a source and the relative location of the impedance mismatch to the server.

6. The method of claim 5, further comprising determining a presence of at least one of a bridged tap, an untwisted segment of twisted pair wiring and a cable fault associated with the transmission line based on the impedance mismatch.

7. The method of claim 6, wherein determining the impedance mismatch comprises:
  estimating a noise level associated with the customer premise equipment device based on the transmission quality data; and
  determining the presence of the bridged tap when the estimated noise level exceeds a threshold noise level.

8. The method of claim 5, wherein a location of the impedance mismatch is determined at an end of the communications loop and wherein the end of the communications loop comprises the customer premise equipment device or a device at the central office.

9. The method of claim 8, wherein the end of the communications loop terminates at the customer premise equipment device and wherein an untwisted segment is coupled to the customer premise equipment device.

10. The method of claim 5, wherein the transmission quality data comprises loop loss data.

11. The method of claim 5, wherein the transmission quality data comprises signal-to-noise ratio (SNR) data.

12. The method of claim 5, further comprising retrieving the transmission quality data from the server adapted to collect the transmission quality data from the customer premise equipment device.

13. The method of claim 5, wherein determining the impedance mismatch comprises:
  estimating a noise spectra associated with the customer premise equipment device based on the transmission quality data; and
  determining presence of the impedance mismatch when a specific portion of the estimated noise spectra exceeds a threshold spectra.

14. The method of claim 5, wherein the relative location is closer to the customer premise equipment device when the second slope is greater than the first slope.

15. The method of claim 5, further comprising initiating removal of the source of the impedance mismatch, wherein initiating the removal comprises generating a work order.

16. The method of claim 15, wherein the work order includes information related to a location of a bridged tap relative to the customer premise equipment device.

17. The method of claim 15, further comprising providing the work order to a maintenance scheduling system.

18. The method of claim 15, further comprising scheduling a maintenance worker to remove a bridged tap based on the work order.

19. A non-transitory computer-readable medium including program code that, when executed by a processor, causes the processor to:
  measure, at a customer premise equipment device, transmission quality data related to a communications loop between the customer premise equipment device and a server;
  determine an impedance mismatch between a transmission line and the customer premise equipment device based on the measured transmission quality data, wherein determining the impedance mismatch comprises:

determining curve shapes of active line noise at an upstream channel frequency boundary from a central office and at a downstream channel frequency boundary from the customer premise equipment device;

determining a presence of the impedance mismatch when a first curve shape of active line noise at the upstream channel frequency boundary has a first slope that is greater than a first slope threshold or when a second curve shape of active line noise at the downstream channel frequency boundary has a second slope that is greater than a second slope threshold;

performing a comparison of the first slope of the first curve shape at the upstream channel frequency boundary to the second slope of the second curve shape at the downstream channel frequency boundary; and determining a relative location of the impedance mismatch based on the comparison of the first slope to the second slope; and transmit a source and the relative location of the impedance mismatch to the server.

20. The non-transitory computer-readable medium of claim 19, further comprising program code that, when executed by the processor, causes the processor to determine the impedance mismatch when an active line noise level exceeds a threshold active line noise level.

21. The non-transitory computer-readable medium of claim 19, further comprising program code that, when executed by the processor, causes the processor to determine the impedance mismatch when a noise spectrum associated with the customer premise equipment device exceeds a threshold spectra.

* * * * *